United States Patent
Krug et al.

(10) Patent No.: US 6,721,736 B1
(45) Date of Patent: Apr. 13, 2004

(54) METHODS, COMPUTER SYSTEM, AND COMPUTER PROGRAM PRODUCT FOR CONFIGURING A META SEARCH ENGINE

(75) Inventors: Adrian Krug, Dusseldorf (DE); Christoph Moll, Bottrop (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 09/713,768

(22) Filed: Nov. 15, 2000

(51) Int. Cl.$^7$ .............................................. G06F 17/30
(52) U.S. Cl. ...................... 707/5; 707/3; 707/4; 707/6
(58) Field of Search ................. 707/1–10, 100–104.1; 706/16, 20, 48

(56) References Cited

U.S. PATENT DOCUMENTS

| | | | | |
|---|---|---|---|---|
| 5,832,235 A | * | 11/1998 | Wilkes ........................ 709/247 |
| 5,913,215 A | * | 6/1999 | Rubinstein et al. ........... 707/10 |
| 6,085,186 A | * | 7/2000 | Christianson et al. .......... 707/3 |
| 6,102,969 A | * | 8/2000 | Christianson et al. ....... 717/146 |
| 6,219,818 B1 | * | 4/2001 | Freivald et al. ............. 714/799 |
| 6,275,820 B1 | * | 8/2001 | Navin-Chandra et al. ...... 707/3 |
| 6,304,864 B1 | * | 10/2001 | Liddy et al. .................. 706/15 |
| 6,304,870 B1 | * | 10/2001 | Kushmerick et al. .......... 707/4 |
| 6,327,590 B1 | * | 12/2001 | Chidlovskii et al. ........... 707/5 |
| 6,370,527 B1 | * | 4/2002 | Singhal .......................... 707/6 |
| 6,424,980 B1 | * | 7/2002 | Iizuka et al. ................. 715/513 |
| 6,430,553 B1 | * | 8/2002 | Ferret .............................. 707/3 |
| 6,490,579 B1 | * | 12/2002 | Gao et al. ....................... 707/4 |
| 6,516,308 B1 | * | 2/2003 | Cohen ........................... 706/12 |
| 6,564,210 B1 | * | 5/2003 | Korda et al. .................... 707/3 |
| 6,636,848 B1 | * | 10/2003 | Aridor et al. ................... 707/3 |

OTHER PUBLICATIONS

Steve Lawrence and C. Lee Giles, "Context and Page Analysis for Improved Web Search", IEEE Internet Computing, Aug. 1998, pp. 38–46.*
Weiyi et al., "Estimating the Usefulness of Search Engines", 1999 IEEE, pp. 146–153.*
Chidlovskii Boris et al.: Automatic Wrapper Generation For Search Engines, In: Proceedings of 1st Int. Conf. on the Web–Age Information Management, Shanghai, China, Jun. 21–23 2000, pp. 399–410.
Gao, Xiaoying; Sterling, Leon: Auto Wrapper: Automatic Wrapper Generation For Multiple Online Services. In: Asia Pacific Web Conference, Hong Kong, Sep. 27–29, 1999.
How MetaCrawler works, http://www.metacrawler.com/helpfaq/howwork.html, Feb. 21, 2001.
About Mama.com, wysiwyg://94/http://www.mama.com/about.html, Feb. 21, 2001.

* cited by examiner

*Primary Examiner*—Greta Robinson
*Assistant Examiner*—Linh Black

(57) ABSTRACT

The invention is directed to a method performed by a meta search engine. In the method a search response provided from the primary search engine in a search response presentation is processed by the meta search engine. The method comprises that the meta search engine adapts itself to a new search response representation. The invention is also directed to a method performed by a computer system to configure an interface to at least one primary search engine. The interface has the function to extract search results from a search response from the primary search engine in a search response representation. The method comprises the automatically adapting of the interface to a new search response representation. The invention is also directed to a corresponding computer system and a corresponding computer program product.

26 Claims, 9 Drawing Sheets

Syntax Tree 90

Clusters 88

METHODS, COMPUTER SYSTEM, AND COMPUTER PROGRAM PRODUCT FOR CONFIGURING A META SEARCH ENGINE

FIELD OF THE INVENTION

The present invention relates generally to meta search engines, and more particularly to methods, a computer system, and a computer program product for configuring a meta search engine to process search responses from primary search engines.

BACKGROUND OF THE INVENTION

The amount of information available via networks and online databases has rapidly increased and continues to increase. In particular, the most popular service of the Internet, the World Wide Web (WWW), has experienced an explosive growth during the last five years. On the other hand, localization of information within the Internet becomes more and more difficult. Driven by its open and uncontrolled organizational structure, the information is stored in an unstructured way, thus making it difficult for the user to retrieve information regarding a specific topic. In particular, there is no central archive which serves as reference to the information included in the Internet. Moreover, no filtering or any other control can be applied to the information in order to improve the accessibility of the available documents in the World Wide Web. Even on a single Web site, it is often difficult for the user to find the desired information just by navigating through the provided hyperlinks (reference to WWW documents). Furthermore, more and more companies offer an additional service to their customers and employees in the form of extensive information around their products and services. Since these information services usually access both the Internet and company internal networks (intranet) that rely on Internet technologies, their structure is similar to the Internet. In addition, the amount of information provided by these services has exceeded a manageable size for customers and employees. As a result, there is a strong demand for tools that facilitate information retrieval in the Internet, intranet or on large Web sites. Tools that are able to search the Internet or intranet for specific information are called search engines.

Search engines enable the user to search through Web pages for specific keywords. They usually rely on searchable databases or archives in which references to web sites, so called Uniform Resource Locators (URL), are filed. Together with the URL, the most relevant site information is stored, i.e. keywords and terms occurring in the corresponding document as well as a brief description of the page content. Special programs, called spiders or Web robots, that search the Web continuously for new sites and identify keywords, help the search engine to complete and update the database.

In recent years, a number of search engines have been established, some of the most common ones can be found at www.altavista.com, www.lycos.com, www.excite.com, or www.yahoo.com. In addition, many other search engines specialize in specific fields, for example patent search (www.patents.ibm.com), local information (www.bigyellow.com), software (www.tucows.com), jobs (www.careerbuilder.com) or music (www.scour.net). Further examples of search engines are intranet search engines, which limit their scope to an internal company, institution or university network.

Search engines provide a user interface via a web page that allows the user to specify keywords or logical combinations of keywords. For instance, a search query using the logical AND combination of the keywords 'computer' and 'games' would retrieve all references to Web sites included in the database of the search engine consulted that contain information related to both computers and games. Generally, the results of a search query received from a search engine are listed and displayed in the user's browser in order of relevance of the document, each list item including the URL, the brief description of the content and the date of the document.

Generally, a user may wish to use several different search engines to increase the reliability of the search. However, with the increasing number of search engines he is confronted with many different types of user interfaces and representations of the search results. Since each search engine has its own individual user interface and options to configure and optimize the search, the user needs to learn to handle different user interfaces and memorize the differences. For instance, the syntax for specifying a logical combination of keywords, keywords consisting of several separated words, or the way upper and lower cases in the search query string are interpreted, varies among the different search engines.

In addition, it is difficult, in particular for the inexperienced user, to keep an overview of existing search service providers and to choose the best one for a specific field of interest. In order to assure he gets the best information available on the network, the user usually has to consult several search engines, enter the same query on several Web sites using different user interfaces and configurations, and finally compare, evaluate and rank the search results from the different search engines. Furthermore, company internal information services are usually based on different online databases each requiring an individual search tool. In summary, there is a strong need to bundle the available services so that the user can access them by only one user interface.

To this end, more and more meta search engines have appeared very recently on the World Wide Web and in company internal networks in order to improve the quality of the information retrieval process in the Internet or intranet and to overcome the above deficiencies for the user caused by the increasing number of search services available. Some of the most common meta search engines are, for example, Dogpile™ (www.dogpile.com), MetaCrawler™ (www.metacrawler.com), Mamma (www.mamma.com), Inference Find (www.inference.com), Find.de (www.find.de), ProFusion (www.profusion.com), Search4 (www.search4.com).

A meta search engine is not a "search engine" in the literal sense, since it does not carry out searches, but rather functions as an interface to primary search engines. Meta search engines provided by companies allow the customers and employees to have one central entry point to search in various internal and external databases for information or solutions related to the company's products and services. In principle, the meta search engine sends search requests using the Hypertext Transfer Protocol (HTTP) to several primary search engines at the same time and bundles the received search results. There is one common user interface for all search engines used to specify a search query. The meta search engine transfers a query further to the primary search engines while converting the query including specific search options to the individual syntax of each primary search engine. In some cases the user can select his preferred primary search engines from a list provided by the meta search engine. The search results returned by the different primary search engines are then processed by the meta search engine to 1) filter out hits (references to Web sites retrieved during the search) that appear in the search results of more than one primary search engine, 2) rank the hits according to a score provided by the primary search engines, and 3) display the hits in a unified layout. More detailed descriptions of meta search engines can be found, for example, at www.metacrawler.com/help/faq/howworks.html or www.mamma.com/about.html.

One of the tasks of a meta search engine is to extract the search result information from the return pages provided by the primary search engines. After having sent a search query as an HTTP request to a primary search engine, the meta search engine receives from it via HTTP the retrieved search information, i.e. a list of hits, embedded in a return page. Since the layout of the return pages of the primary search engine is not standardized, i.e. the different primary search engines display their search results differently, the meta search engine is configured to cope with the different layouts and formats of the search results of the various primary search engines. Moreover, if a supplemental primary search engine is added to the meta search engine, a new configuration is included. Furthermore, the layout of the search result may change from time to time. Therefore, the various configurations are also reviewed periodically and are adapted if changes occur.

SUMMARY OF THE INVENTION

According to a first aspect, in a method performed by a meta search engine, a search response provided form a primary search engine in a search response representation is processed by the meta search engine. The method comprises that the meta search engine adaots itself to a new search response representation.

According to another aspect, the invention provides a method performed by a computer system to configure an interface to at least one primary search engine. The interface has the function of extracting search results from a search response from the primary search engine in a search response representation. The method comprises the automatically adapting of the interface to a new search response representation.

According to a further aspect, the invention provides a computer system that comprises a meta search engine and a configurator. The meta search engine comprises an interface to at least one primary search engine. The configurator is designed to adapt the interface automatically to a new search response representation of the primary search engine.

According to yet another aspect, the invention provides a computer program product including the program code for carrying out a method for configuring an interface to at least one primary search engine, when executed on a computer system. The interface has the function of extracting search results from a search response from the primary search engine in a search response representation. The method comprises the automatically adapting of the interface to a new search response representation.

Other features are inherent in the disclosed method and apparatus or will become apparent to those skilled in the art from the following detailed description of embodiments and its accompanying drawings.

DETAILED DESCRIPTION OF THE PREFERRED EMBODIMENTS

Figure 1:
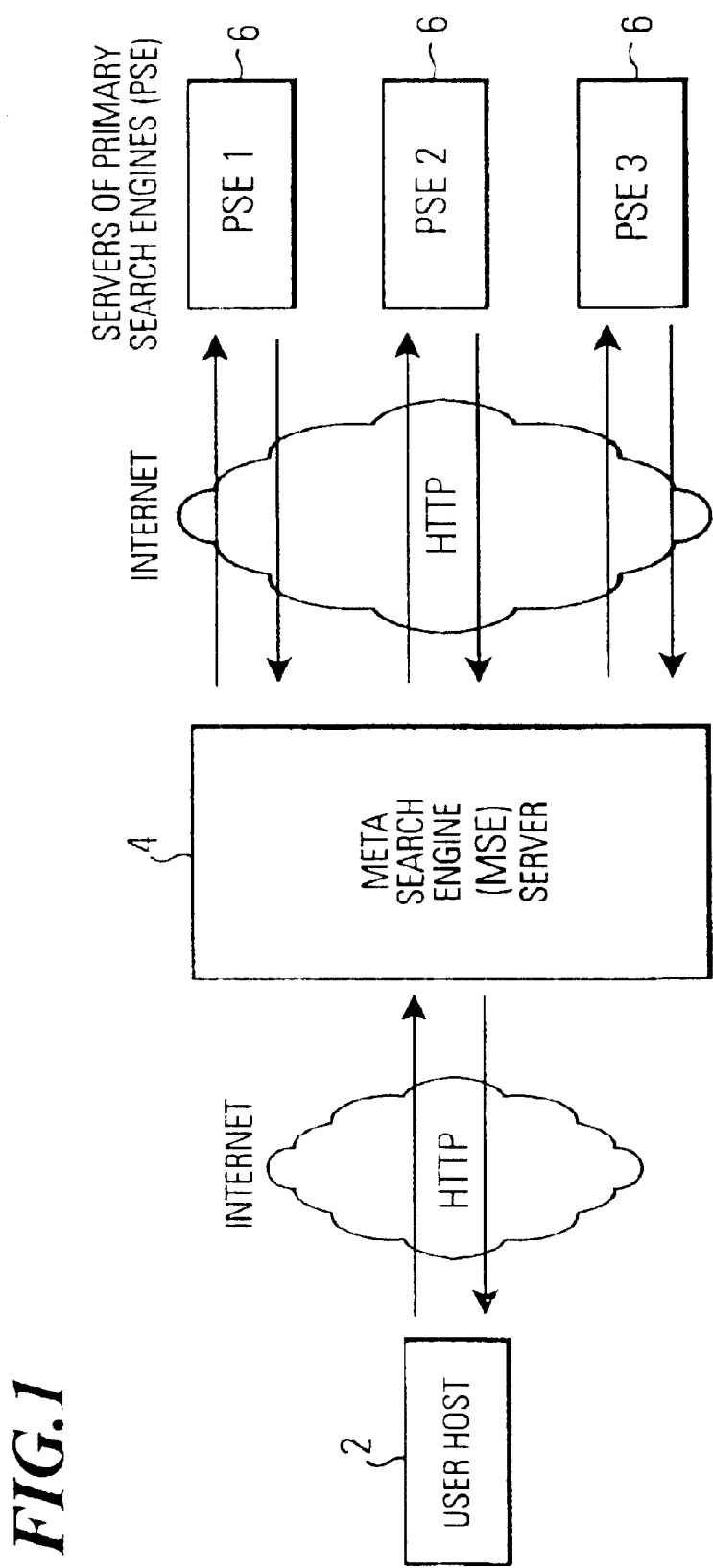
FIG. 1 is a block diagram visualizing the high level architecture of a system including a meta search engine, a primary search engine and a user host computer.

The general function of the preferred embodiments is depicted in FIG. 1. Before proceeding further with the description, however, several items of the preferred embodiments will be discussed.

In the preferred embodiments "primary search engine" refers to an Internet search engine retrieving information from a particular database of Internet documents. In contrast, the term "meta search engine" refers to a search engine that has no direct access to such a database, but rather serves as an interface to other primary search engines. Therefore, a meta search engine comprises an interface to the user and an interface to other primary search engines, wherein the latter may either be a part of the meta search engine or be a separate software component located somewhere else in the network.

The term "search response representation" refers to the general layout of the document containing the search results of a primary search engine, but not to a particular search response regarding a particular search query. The representation of search responses of primary search engines is subject to changes. Therefore, the term "new search response representation" not only refers to search response representations of new primary search engines that are added to the meta search engine, but also to changes of search response representations of primary search engines that are already part of the meta search engine.

The term "hit" refers to a particular document found by the primary search engine during the Internet search. Usually, the hits retrieved by a primary search engine are embedded in the search response representation among other information. The search result information associated with a hit is grouped together in a "result frame". Hence, a primary search engine usually retrieves several hits during an Internet search, the search response representation comprises a number of result frames with the corresponding hits and additional parts that are not related to a particular search query.

In the preferred embodiments, the search responses are encoded in either one of the markup languages HTML or XML. Documents encoded in these languages can be viewed as a sequence of markups (tags) placed within the text defining the format and layout of the text. In this context, the term "syntax" and accordingly "syntax element" refer to the representation of these markups within the text and their specific meaning. A syntax pattern is a certain sequence of such syntax elements, where the order and the relationship between the syntax elements are important features of the pattern. When displayed with an HTML or XML compatible browser (software tool for displaying Internet documents encoded in HTML or XML), changing one syntax element within an HTML or XML document usually has an effect on the appearance either with respect to the layout or the format of the corresponding part of the text.

The term "search result information" summarizes in this context the information associated with a hit that has been retrieved by a primary search engine, in particular, the URL, the title of the documents, a brief description of the content of the document, a date, and so on.

One aspect of the disclosed method for automatically adapting an interface between a meta search engine and primary search engines to a new search response representation is the recognition of repetitive syntax patterns within HTML or XML documents. This particular aspect is generally applicable for the automatic analysis, content retrieval and detection of format changes of documents. One application, for instance, in which the recognition of repetitive patterns within the syntax structure in HTML or XML documents is advantageous, is, the detection of price information in product lists in e-business applications. Therefore, we reserve hereby the rights to claim protection for this aspect separately without reference to search engines.

Although, the disclosed method is preferably implemented by software, it could likewise be implemented in whole or in part by firmware or hardware without departing from the scope or the spirit of the invention.

The automatic adaptation to new search response representations can be viewed in two different ways. From one point of view, the meta search engine as a whole adapts itself in order to cope with new search response representations. From another point of view, more specifically, only the part of the meta search engine that functions as an interface to other primary search engines adapts its configuration automatically to new search response representations. For the latter, different embodiments are possible. In the preferred embodiments, the complete interface is integrated in the meta search engine, while in other embodiments, the complete interface or parts of the interface are separated from the meta search engine and distributed over the network. For instance, it is possible to de-localize only the part of the interface that performs the recognition and analysis of result frames in new search response representations.

Apart from the function of adapting to new search response representations, the interface has the function of extracting the search result information from "old" search responses, i.e. search responses that are already known to the interface. Therefore, in the preferred embodiments, the first step is to determine whether the search response in question is "old" or new, i.e. whether the search result information can be extracted directly using a search response representation already known to the interface, or whether a procedure for detecting the search result information within the new search response representation has to be started. However, generally, the adaptation to new search response representations does not require to distinguish between new and "old" search response representations since it is well possible to consider all search responses as new and apply the adaptation. Therefore, in other embodiments (not shown), the procedure for detecting the search result information within the search response representation is applied to all search responses, or in other words, there is no step implemented for automatically recognizing search response representations as new.

In the preferred embodiments, search response representations that have already been recognized are stored in the interface and are thus known to the interface. Therefore, the criteria for considering a search response representation as new is that it has not been recognized before, i.e. that it is not yet stored in the interface.

Normally, parts of the search response contain information that is not related to the search result information and are thus eliminated for the further recognition analysis. Therefore, in the preferred embodiments one step is to distinguish automatically those parts of the search response that carry the search result information, i.e. the result frames, from those parts that are not related to a specific search result. Most preferably, this is accomplished by detecting automatically either one or both of those parts by comparing two search responses from two different queries. Normally, parts of the search response that contain no search result information like logos, commercials, instructions for the user, or control elements, are identical in the search responses of two consecutive search queries and are preferably identified as the parts whose content does not change within different search responses, Usually, the primary search engine retrieves several hits for a single search query. Those hits are displayed in the form of a list of result frames each containing one hit. One way to recognize the result frames within the search response representation is to use this repetitive occurrence of the result frames. Therefore, for the detection of the result frames, the preferred embodiment uses search responses that contain more than one result frame. These repetitive result frames are most preferably identified by their similar appearance within the search response representation.

Normally, the search result information contained in a result frame comprises several components, such as the URL, the title, a brief description, and the date of the corresponding document. These different components are displayed in different formats and layouts and are thus most preferably identified by their specific visual appearance.

The block diagram of FIG. 1 shows the function of a meta search engine 4 as an interface between a user host computer 2 and several servers of primary search engines 6 for the preferred embodiments of the invention. Instead of sending a search query request to all of the servers of the primary search engines 6 separately, the user host computer 2 directs its request only once to the meta search engine server 4 that converts the query to the specific requirements of the primary search engines 6 and transmits the specific search request to the individual servers of the primary search engines 6. After receiving the individual search results from the primary search engines, the meta search engine detects and bundles the search results, converts them into a unified format and sends them back to the user host. In this way, the user is able to access several primary search engines at a time while only sending one single search query to the meta search engine and to receive the filtered and unified search responses of the different primary search engines all at once on the display.

Figure 2:
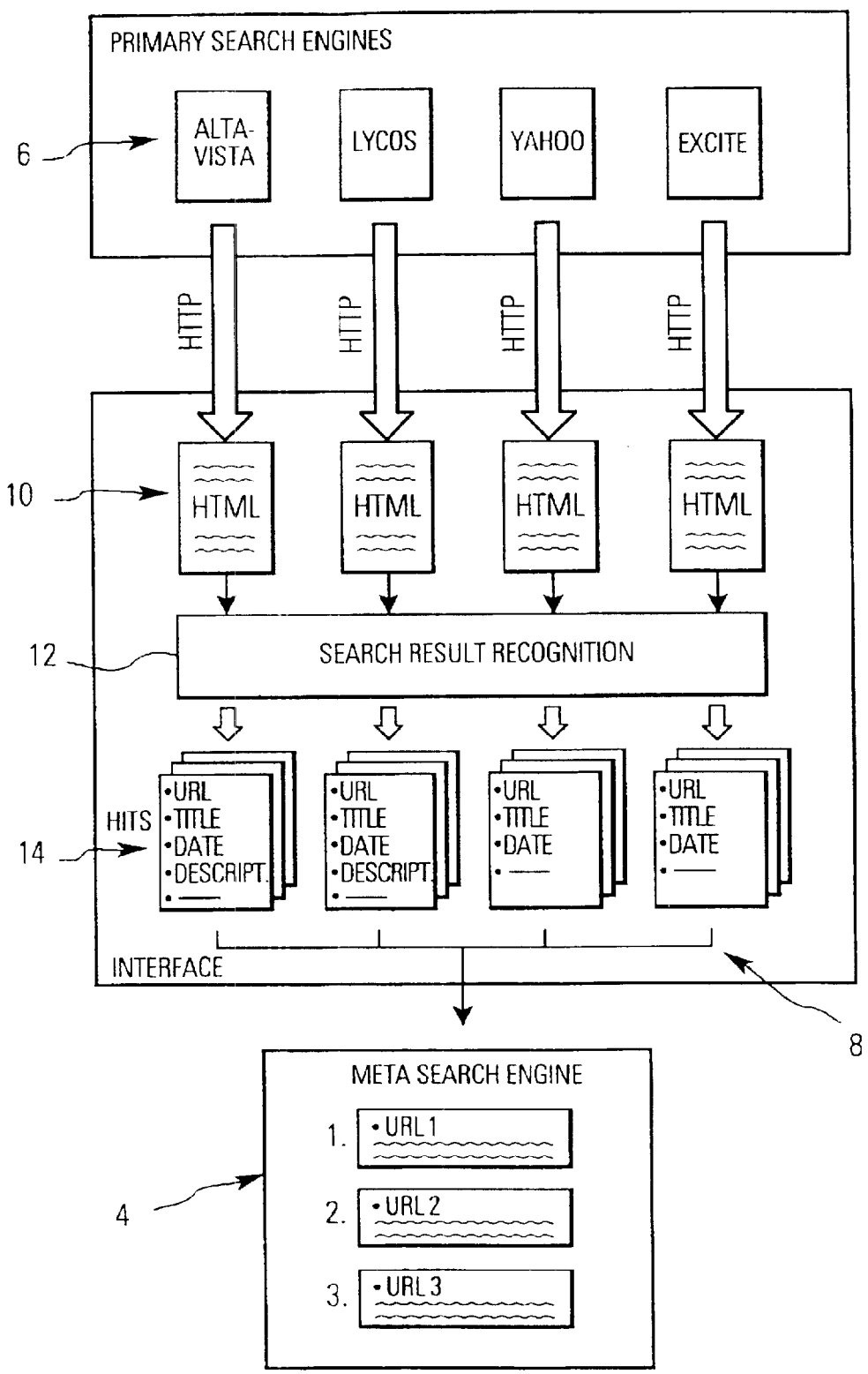
FIG. 2 is a functional representation of an interface between a meta search a engine and a primary search engine.

FIG. 2 is a functional high-level representation of an interface 8 between the meta search engine 4 and the primary search engine 6. The interface 8 generally serves as configurator for adapting the meta search engine 4 to new search response representations. As already mentioned above, the interface 8 might either be implemented as part of the meta search engine 4 or as a separate software component. The scheme of FIG. 2 assumes that a search request from a user has been forwarded by the meta search engine 4 to the primary search engine 6 and that the primary search engines 6 have retrieved their individual search responses. The search responses are, for example, encoded in the HTML markup language.

In response to the search request of the meta search engine 4, the primary search engine 6 returns the search response in the form of an HTML document via HTTP to the interface 8. A search result recognition 12 is applied to the individual HTML search responses of the primary search engines detecting the search result frames and its content in the search responses. The search result recognition 12 is able to detect the result frames and to extract the information associated with the hit, even if the layout, the format or the position of the result frames within the HTML document or the internal structure of the result frame are changed or a completely new primary search engine using a new search response representation is added to the existing primary search engines. A result information 14 that is contained in a result frame comprises the URL, the title of the referenced document, a brief description of the content of the referenced document, the date, the source of the search results, i.e. the name of the primary search engine, and a score indicating the relevance of the retrieved document. The extracted search result information 14 is then transferred further to the meta search engine 4. In the preferred embodiments, the hits are ranked according to their score and are displayed in a unified format while hits that have been retrieved by more than one primary search engine are removed.

Figure 3:
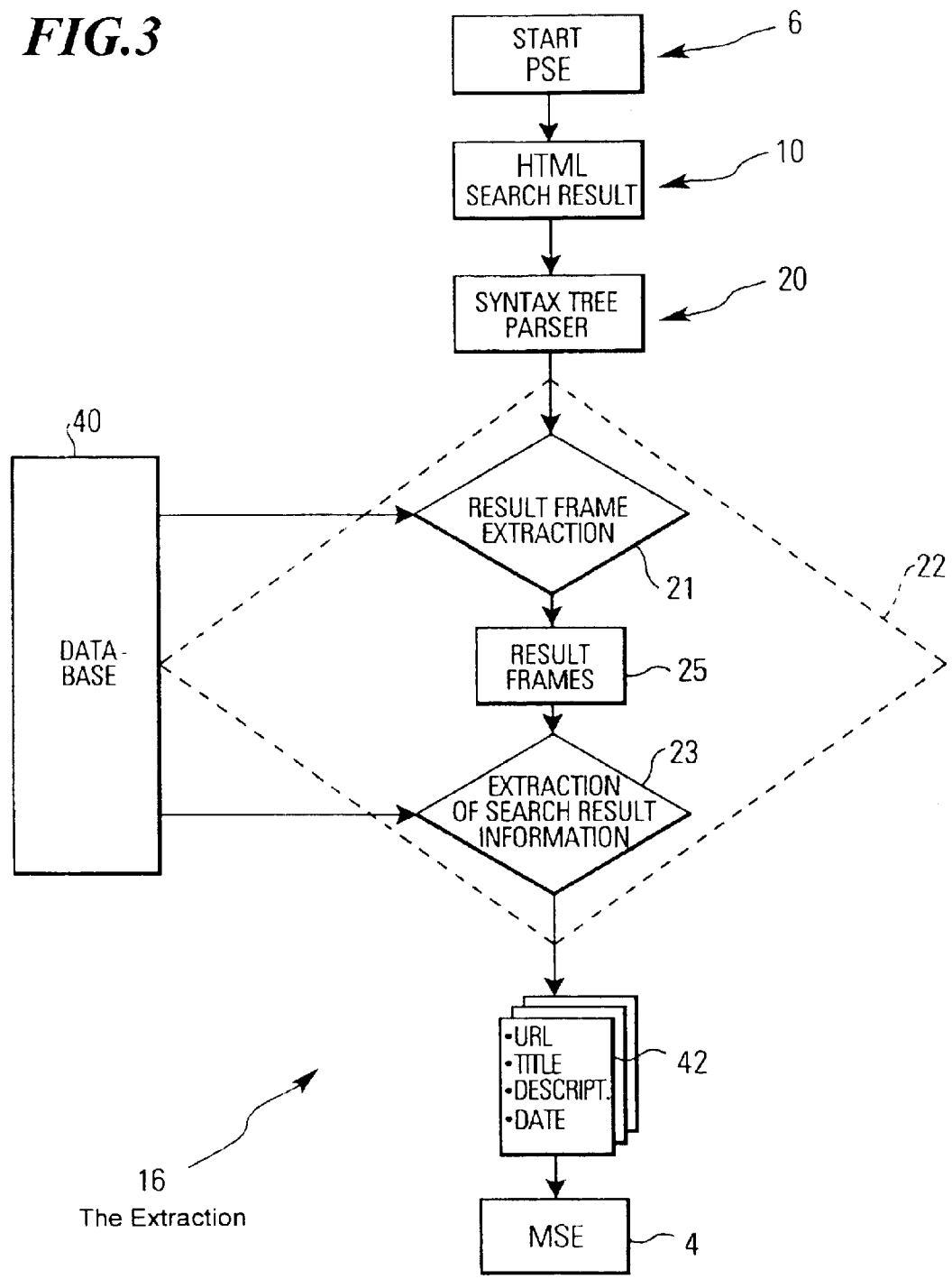
FIG. 3 is a block diagram illustrating the extraction of search result information.

In the preferred embodiments, two cases of extraction of search results can be distinguished. First, the search response representation in question is already known and integrated into the interface and second, the search response representation is new. Since the meta search engine has no control over the layout of the primary search engines and it is not even notified by the primary search engine of such layout or format changes, it has to be able to handle both cases, "old" and new search response representations. The extraction 18 of search result information from new search response representations and how a search response representation is recognized as new is explained in more detail in FIG. 4 for the preferred embodiments. In FIG. 3, the steps 16 for extracting the search result information from search responses having "old" search response representations that are already known to the interface are illustrated.

In the preferred embodiments depicted in FIG. 3, an HTML search response document 10 is returned by a primary search engine 6. A hierarchical HTML syntax tree is constructed by a syntax tree parser 20 serving as a basis for all further processing.

An extraction step 22 is applied to the syntax tree of the search response comprising two steps, the result frame extraction 21 and the extraction of the search result information 23. First, the result frame extraction localizes and extracts different result frames 25 contained in the search response by comparing the syntax tree of the search response to known syntax patterns of result frames stored in a database 40. For that, a syntax pattern of the database 40 is compared with all syntax sub-trees of the search response. A result frame is detected when a syntax sub-tree is identical to the syntax pattern. When all syntax sub-trees of the search response have been tested, the detected result frames 25 are transferred to the second extraction step 23 to identify the search result information. In the preferred embodiments, together with the syntax pattern of the result frame, the role of the syntax elements for carrying the search result information is also stored in the database 40 as an additional attribute. Thus, a certain type of search result information 42 (URL, title, date, description, source, score) is associated with a particular syntax element of the result frame. These attributes are then used by the extraction step 23 to determine the search result information 42 of the hit and pass it to the meta search engine 4. In other embodiments (not shown), the association of the search result information with particular syntax elements is not stored in the data base together with the syntax pattern as attributes, but are identified on every extraction step 22.

Figure 4:
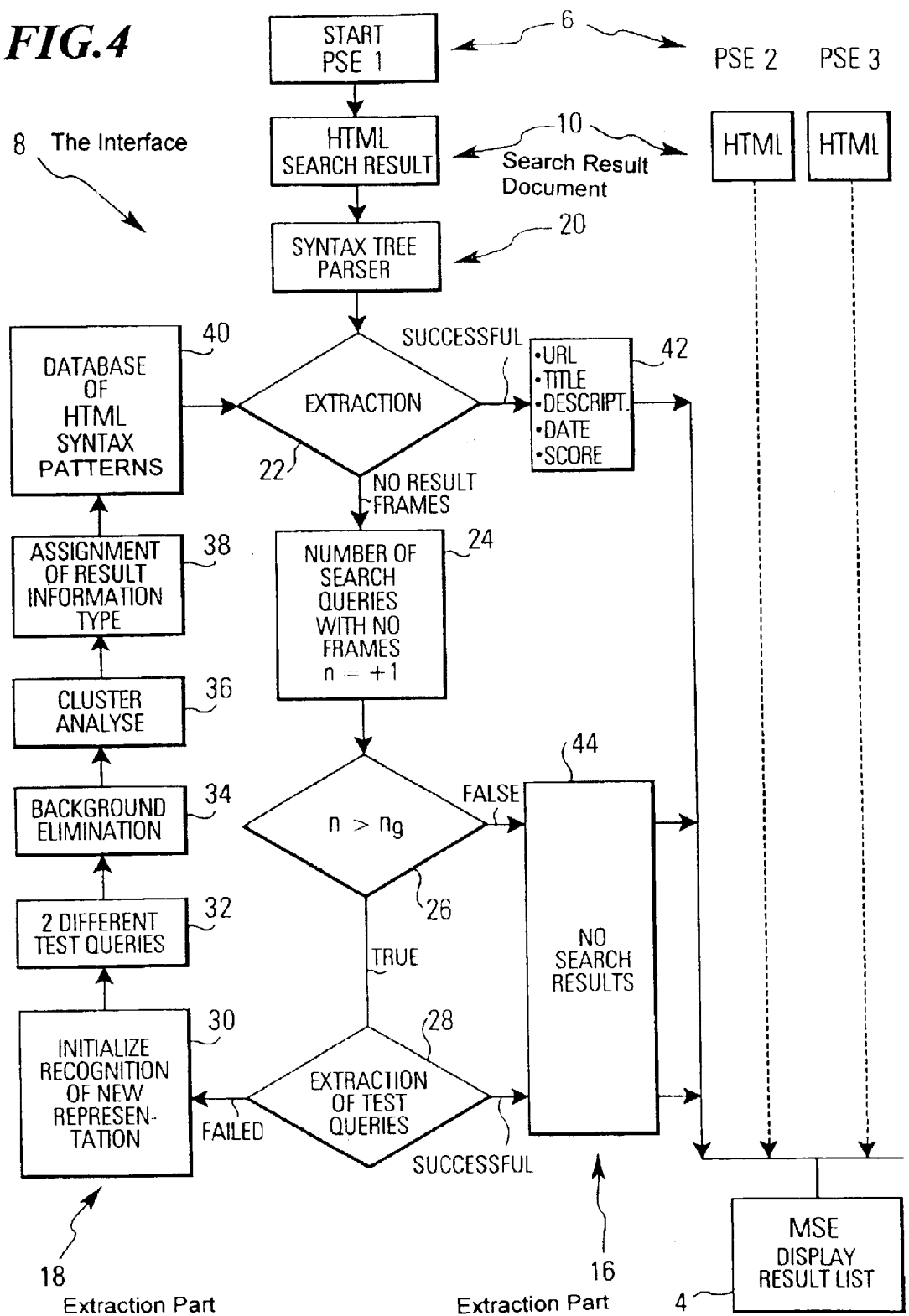
FIG. 4 is a block diagram illustrating the automatic recognition of new search response representations.

In FIG. 4, the steps of the automatic recognition of search result information performed by the interface 8 are depicted in a block diagram. The complete interface comprises two extraction parts 16 and, 18, wherein the extraction 16 processes search responses of "old" search response representations that have been recognized before and have already been integrated into the interface. On the other hand, the extraction 18 performs a recognition of new search response representations that are not yet known to the interface.

Assuming as input to the interface 8 an HTML search result document 10 that has been returned by a primary search engine 6, the syntax tree parser 20 analyses the HTML syntax structure of the search result document by recognizing the HTML tags within the document and constructing a hierarchical HTML syntax tree that represents the hierarchical relationship of the syntax elements (tags). Thus the HTML document is transformed into a syntax tree representing the format and layout structure of the original HTML search response.

The purpose of the extraction step 22 is to determine whether the HTML syntax tree in question contains a representation of result frames that are already known to the system. To achieve this, the HTML syntax tree is compared to the HTML syntax pattern of a database 40, in which the HTML syntax structure of the known result frame is stored. If the extraction step 22 is able to localize the result frames within the HTML search result document, the meaning of the different syntax elements within the result frames is determined and the corresponding search result information 42 is extracted and transferred to the meta search engine 4. Otherwise, there are two possibilities. First, the primary search engine did not retrieve any search results, or second, the search response representation is new to the interface and thus no result frames could be extracted. In order to decide on these two possibilities, two criteria are checked. First, it is checked whether the number of consecutive failures to extract result frames exceeds a certain limit, and second, whether result frames can be extracted from test queries that are known to retrieve a search result.

If no frames could be detected by the extraction step 22, a counter 24 is incremented. If the counter is below a certain threshold value 26, then it is assumed that the original search query did not retrieve any search result and thus a "no search result" message 44 is transferred to the meta search engine 4. Otherwise, the result frame extraction has failed for a certain number of times thus being very probable that the search response representation is new. Therefore, the second criteria is checked and a number of test queries for which the primary search engine is known to retrieve more than one hit are performed by step 28. A similar comparison procedure as in the extraction step 22 is applied in step 28 to the search responses of the test queries. If result frames can be extracted from the search responses of the test queries, meaning that, in contrast to the first assumption according to the first criteria, the search response representation is not new and result frames can generally be extracted from this search response representation, then it is assumed that the original search query did not retrieve any search results. Therefore, the and result message 44 is transferred to the meta search engine 4. But if the extraction 28 could not extract result frames from the search responses of the test queries, the search response representation is finally assumed to be new, and part 18 of the interface is initialized by step 30 to recognize the new search response representation. In conclusion, the interface assumes a new search response representation if both of the following conditions are true: 1.) the search frame extractions failed for a number of consecutive search queries, and 2.) the search frame extraction failed for a number of test queries. In other embodiments (not shown), only the first condition is used to initialize the recognition of new search response representations.

For the recognition of new search response representations, step 32 requests two different test queries from the primary search engine 6 which are known to provide a number of hits for each of the test queries. Step 34 then compares the syntax trees of the search responses of the two different test queries identifying those parts of the syntax tree (sub-trees) that are completely identical in both syntax trees. Since those subtrees are supposed to contain no search result information, such as advertisements or control elements, they are eliminated from the HTML syntax tree of the search responses of the test queries. According to experimental data using this background elimination 34, the size of the HTML syntax tree can be reduced by about 40%.

The reduced HTML syntax tree is further passed to step 36, where a cluster analysis is performed in order to recognize the HTML syntax structure of the result frame within the search response representation. The cluster analysis 36 detects repetitive patterns in the syntax tree structure of the search response representation and identifies those as the syntax structure of the result frames. The result of the cluster analysis is thus HTML syntax pattern representing the result frame. In step 38 the result information is assigned to the different syntax elements of the result frame. The determination of the meaning of a particular syntax element is typically done by applying heuristic criteria: 1) the URL is recognized by the special HTML tag <a href="http:// . . . ">, 2) the description by the longest uniform text segment, 3) the title by the tag defining the bold face <b> and a surrounding <a href=" . . . ">tag, 4) the date by number format, and 5) the score by the text marker "%" and the order of the hits within the search response. Another criteria that is taken into account is the order of appearance of the elements within the result frame.

Finally, the extracted HTML syntax pattern including the assignment of the syntax elements to the different components of the search result information is added to the database 40 containing already recognized HTML syntax patterns of result frames.

The same method as described above is subsequently performed with the search responses of the other primary search engine 6 and its HTML search result documents.

Figure 5:
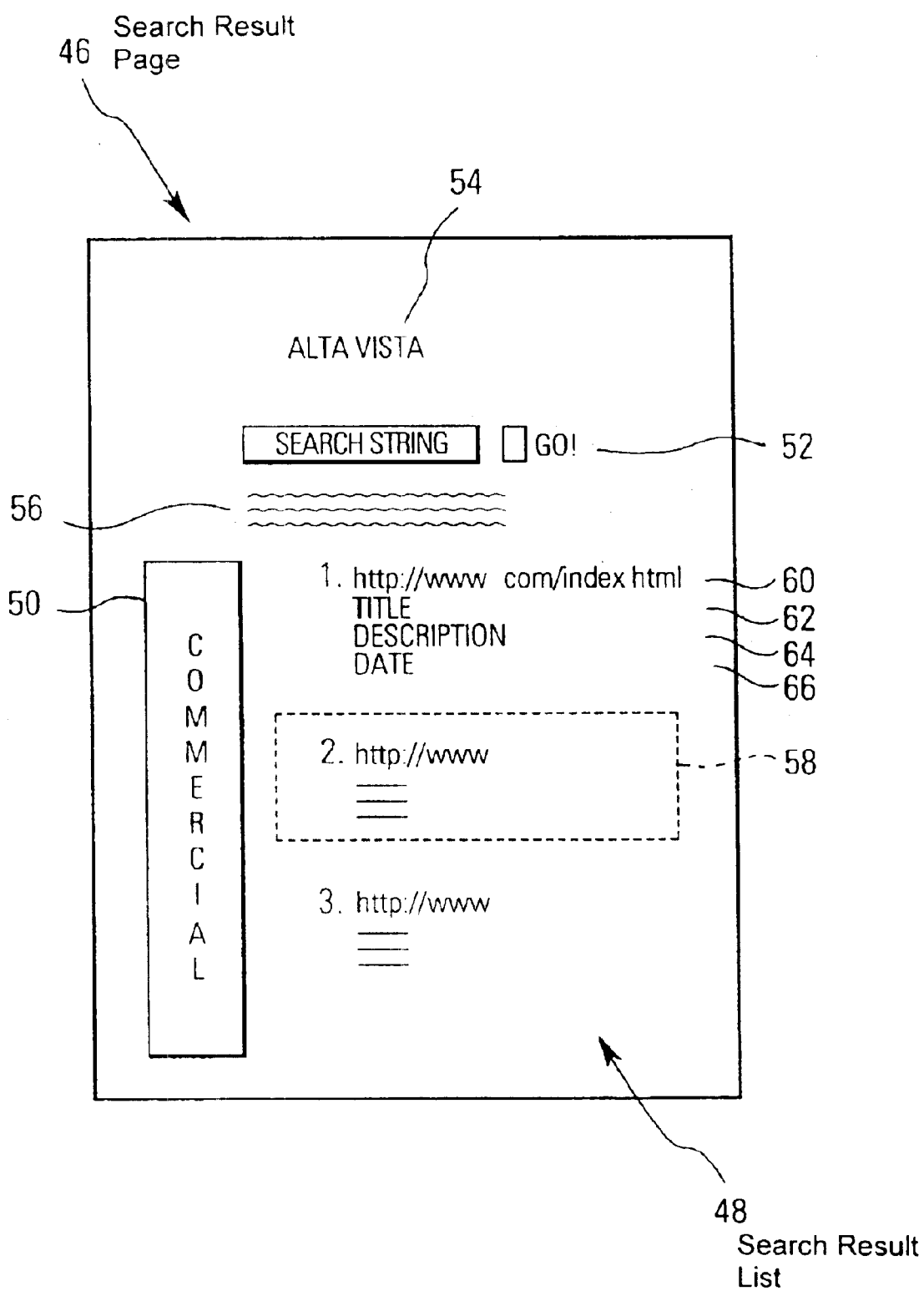
FIG. 5 shows a typical search response of a primary search engine.

The cluster analysis 36 of the preferred embodiments is described in more detail below. A typical search response of the popular AltaVista primary search engine displayed in an Internet browser, is shown in FIG. 5. The search result page 46 shows parts of the search response containing information that is related to the search query, namely the search result list 48, and other parts (50, 54), that are not related to a specific search query. The latter comprises commercials 50, control elements 52, logos 54, and instructions for the user 56. On the other hand, the result list 48 comprises a consecutive arrangement of result frames 58, that includes the URL of the corresponding hit 60, the title 62, a brief description of the content of the referenced document 64, and the date 66.

Figure 6:
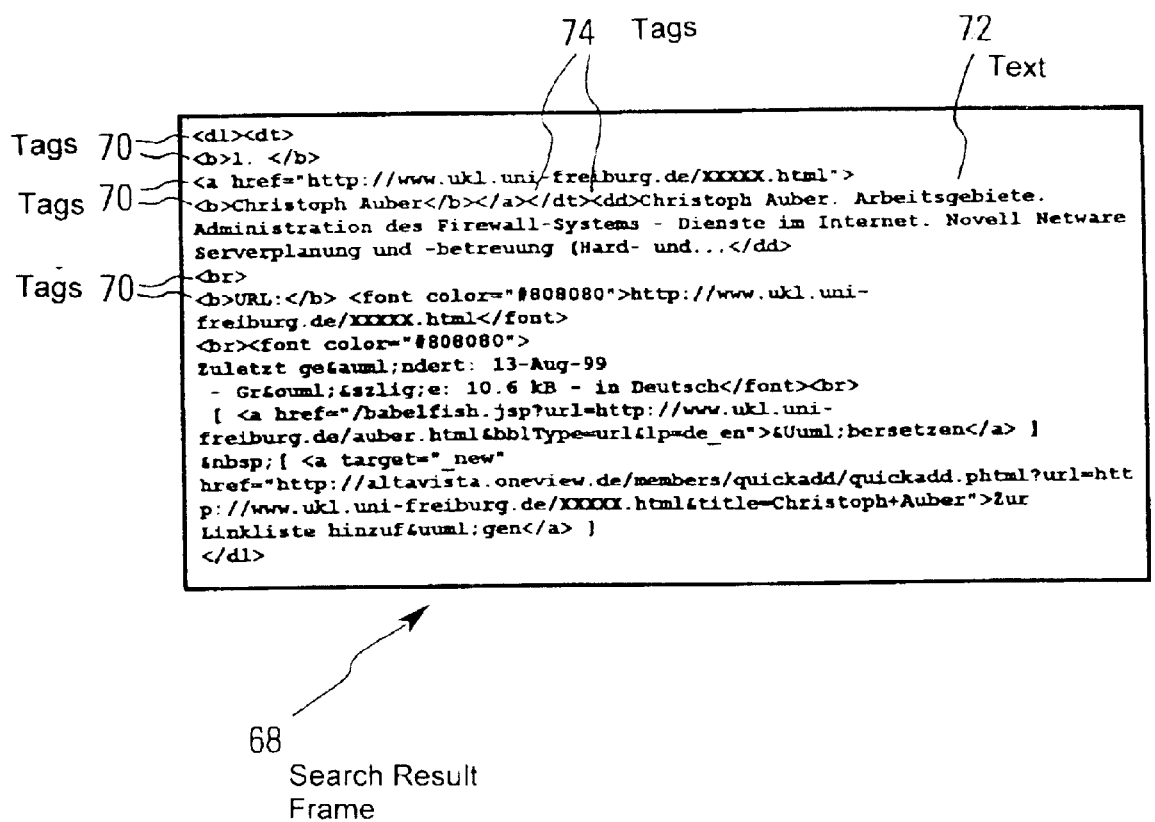
FIG. 6 depicts the HTML source code of a particular search result frame.

FIG. 6 shows a sample of HTML source code 68 corresponding to a particular search result frame 58. This sample 68 is composed of HTML syntax elements (tags) that define the format and the layout of the enclosed text, and the text 72 of the document sample itself. For instance, the syntax element <d> defines a certain type of list, <dt> defines a element of that list, <dd> defines the content of the list element, <b> causes the following text to be bold, <br> inserts a line break, and <a href=" . . . "> is a reference to an URL, with each of the elements having its corresponding end tags 74 </dl>, </dt>, and so on.

Figure 7:
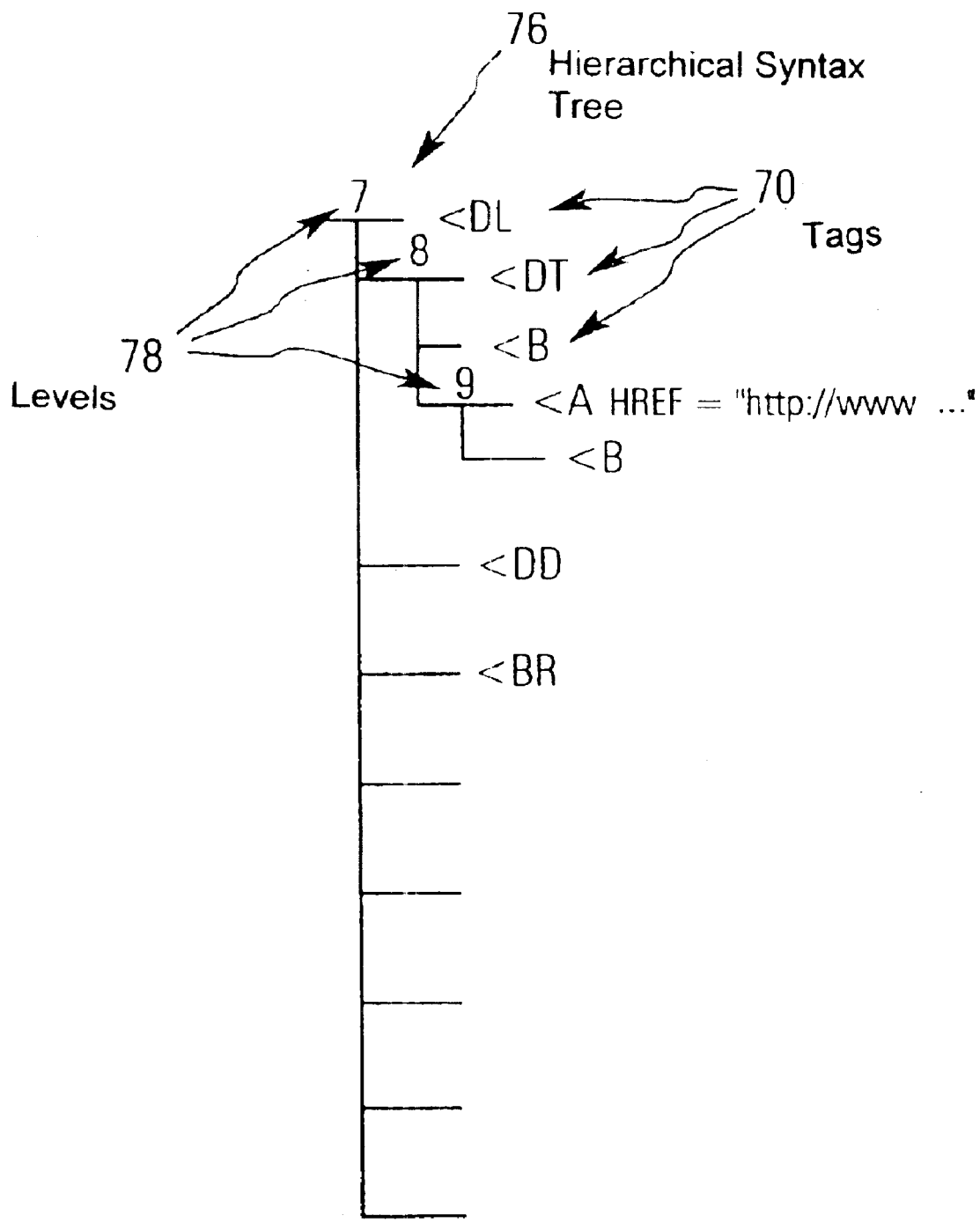
FIG. 7 depicts an HTML syntax tree corresponding to the search result frame of FIG. 6.

FIG. 7 shows the HTML syntax tree provided by the syntax tree parser 20 corresponding to the search result frame 68 of FIG. 6. The syntax tree is the basis for all further procedures. In the preferred embodiments, the syntax tree parser is executed by a module of the interpreter programming language PERL. In the hierarchical syntax tree 76, the HTML tags are arranged in order of their appearance in the documents while their dependence on other tags 70 is represented by their level 78. If a certain tag applies before the end tag of the preceding tag is set, then the tag in question is classified one level deeper in the syntax tree. For instance, the syntax sub-tree 76 corresponding to a particular search result frame starts at level 7 and goes down to level 9.

Figure 8:
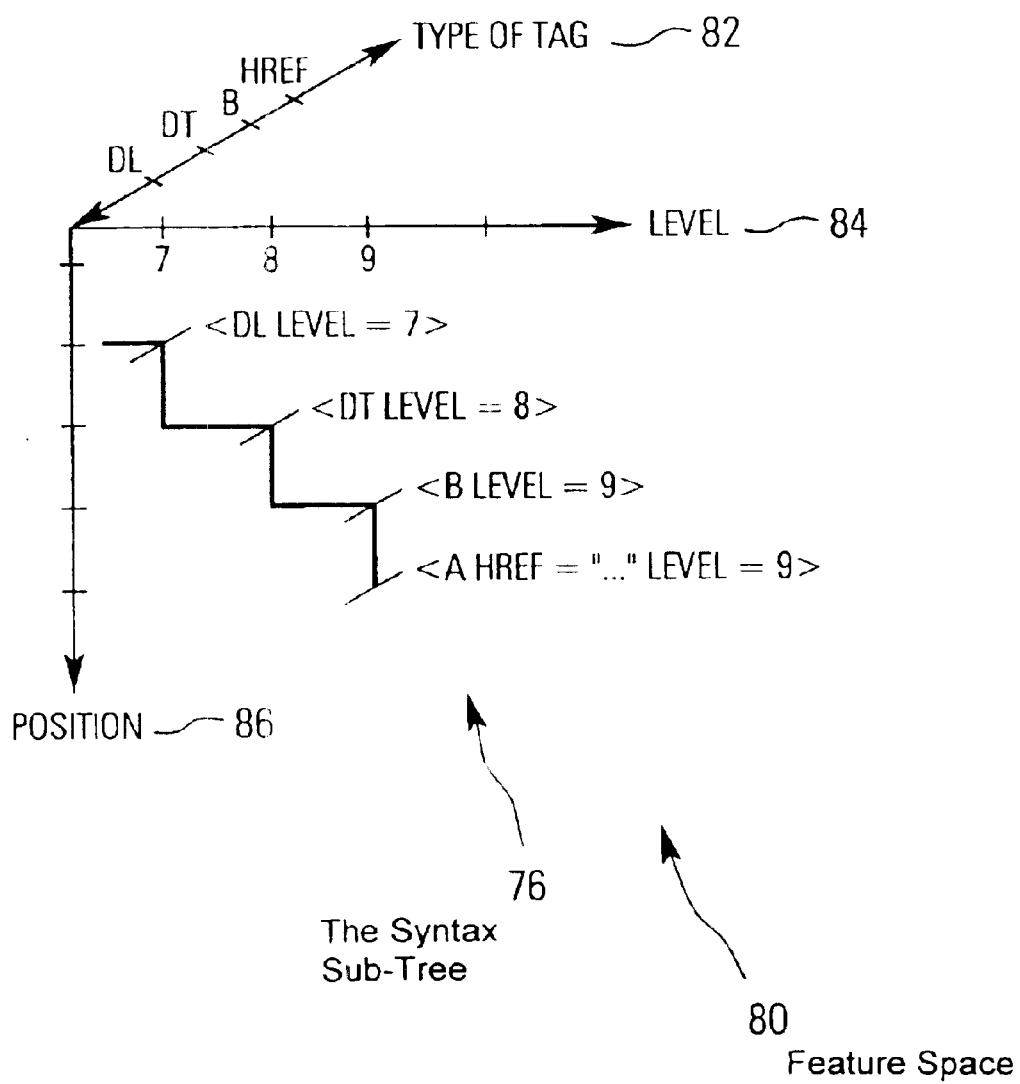
FIG. 8 depicts a three-dimensional feature space for HTML syntax elements.

In summary, each node of the HTML syntax tree is characterized by the following three attributes, the type of the tag 70, the appropriate level 78, and its consecutive position within the HTML document. These three attributes span the feature space 80 depicted in FIG. 8. Each syntax element is classified in the three-dimensional feature space according to the three dimensions type of tag 82, a level 84 within in the hierarchical syntax structure, and the position 86 within the HTML document. In FIG. 8 an arrangement of several consecutive syntax elements 76 is indicated that form a pattern in the feature space and that are a part of a particular result frame.

Figure 9:
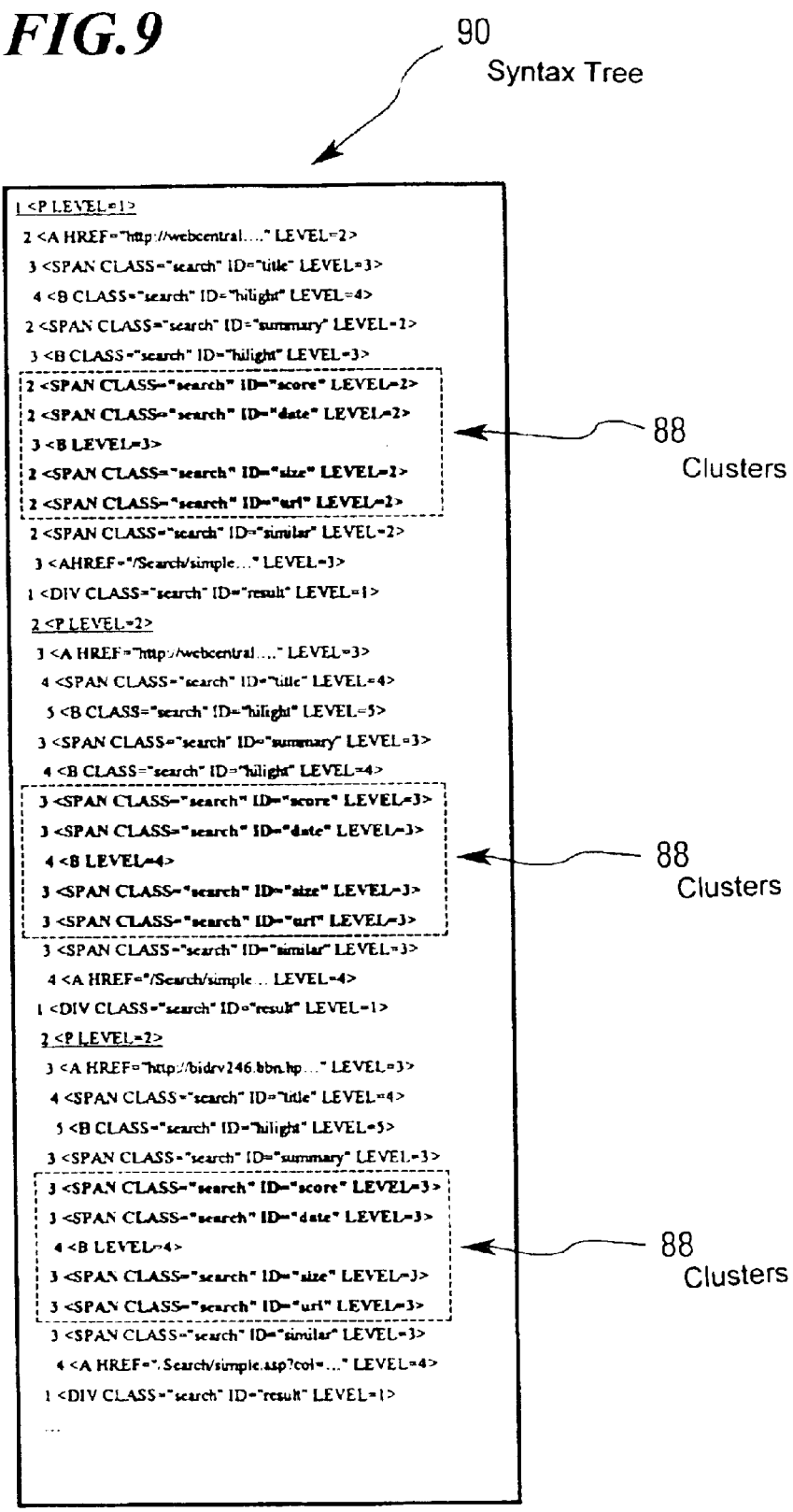
FIG. 9 shows an HTML syntax tree of a part of a search result list.

The syntax tree of parts of a search result list is shown in FIG. 9. In the preferred embodiments the method for detecting the search result frame is to search for equal clusters (patterns) of syntax elements of size 5 within the syntax tree 90. The localization of these clusters 88 then permits the different search result frames to be distinguished and the syntax structure of such a result frame to be determined. This syntax pattern is then stored in the database 40 of FIG. 3 where it is used to extract the search result frames from future search responses.

In FIG. 7, the syntax pattern of a result frame is shown with its absolute level. In other embodiments (not shown), the detected syntax patterns of a new search response representation are stored In the database 40 of FIG. 3 in a normalized manner, i.e. the root level of the hierarchical sub-tree corresponding to the detected syntax pattern is set to one and the level of the consecutive syntax elements are adjusted accordingly. Consequently, only the relative level of the elements of the syntax pattern with respect to the root level is stored making the comparison process 22 invariant to the absolute level of the syntax pattern of the result frame within the search response representation.

One constraint imposed on the detection of the result frames in order to make the procedure 18 more reliable is that the syntax structure of a result frame is required to have a certain complexity, i.e. a minimum number of tags and a minimum level depth (deepest level of the normalized syntax pattern).

In some primary search engines the syntax structure of result frames may not be identical for all result frames but vary slightly within one search response representation. Hence a model is required that represents similar result frames in just one pattern. For instance, there might be an additional syntax element defining a line break inserted within the syntax pattern. For that, a wildcard, leaving the type of tag undetermined, is inserted in the syntax pattern at the position where an additional tag might possibly occur. During the syntax pattern comparison in the extraction step 22 of FIG. 3 the syntax tree element corresponding to the wildcard element can take any syntax type. Thus the extended syntax pattern is flexible to detect similar but not identical result frames within a search response representation.

Thus, a general purpose of the disclosed embodiments is to provide an improved method, computer system and computer program product for adapting an interface of a meta search engine automatically, i.e. without manual interaction, to a new search response representation, whereas in the prior art the control and adaptation is done manually.

All publications and existing systems mentioned in this specification are herein incorporated by reference.

Although certain methods, systems and products constructed in accordance with the teaching of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method automatically performed by a meta search engine, wherein a search response provided from a primary search engine in a search response representation including search result frames is processed by the meta search engine, the method comprising:
   producing an at least two-dimensional syntax tree of at least a part of the search response representation;
   searching repetitive equal or similar patterns of syntax elements within the syntax tree, and identifying, and thereby localizing, the search result frames within the search response representation by an equal or similar appearance of their patterns of syntax elements; and
   adapting the meta search engine to the search response representation based on the localized search result frames, at least if it is a new search response representation.

2. The method of claim 1, wherein the meta search engine comprises an interface for extracting search results from the search response, and the adaptation of the meta search engine is performed by automatically configuring the interface to the new search response representation.

3. The method of claim 1, wherein the meta search engine automatically recognizes a new search response representation.

4. The method of claim 3, wherein a search response representation is considered as new if the meta search engine has not recognized it before.

5. The method of claim 1, wherein adapting the meta search engine further comprises detecting automatically at least one of:
   i) those parts of a search response representation that contain no search result information, and
   ii) result frames in a search response representation, wherein result frames are those parts of a search response representation that contain the search result information.

6. The method of claim 5, wherein detecting automatically those parts of a new search response representation that contain no search result information further comprises comparing at least two different search responses.

7. The method of claim 6, wherein detecting automatically said parts further comprises identifying the parts that contain no information as the parts whose content does not change in different search responses.

8. The method of claim 3 using components of a result frame, wherein the appearance of the different components of a result frame is used to identify the specific type of information that is contained in the corresponding component, wherein result frames are those parts of a search response representation that contain the search result information.

9. A method performed by a computer system of automatically configuring an interface to at least one primary search engine for extracting search results from a search response provided by the primary search engine in a search response representation including search result frames, the method comprising:
   producing an at least two-dimensional syntax tree of at least a part of the search response representation;
   searching repetitive equal or similar patterns of syntax elements within the syntax tree, and identifying, and thereby localizing, the search result frames within the search response representation by an equal or similar appearance of their patterns of syntax elements; and
   adapting the interface automatically to the search response representation based on the localized search result frames, at least if it is a new search response representation.

10. The method of claim 9, wherein the interface is part of a meta search engine.

11. The method of claim 9, wherein a search response representation is considered as new if the interface has not recognized it before.

12. The method of claim 9, wherein automatically adapting the interface further comprises detecting automatically at least one of the following:
   i) those parts of a search response representation that contain no search result information, and
   ii) result frames in a search response representation.

13. The method of claim 12, wherein the detection of those parts of a new search response representation that contain no search result information further comprises comparing at least different search responses.

14. The method of claim 9, wherein the dimensions of the syntax tree refer to dimensions in a feature space, wherein the features are derived from the syntax structure of the search response representation.

15. The method of claim 9, wherein the search response representation is encoded using a markup language.

16. The method of claim 15, wherein the search response representation is encoded using at least one of HTML and XML.

17. The method of claim 9, wherein automatically adapting the interface further comprises automatically determining the meaning of the parts of the result frame.

18. The method of claim 17, wherein determining the meaning of the parts of the result frame further comprises assigning the syntax elements of the result frame to the corresponding search result information.

19. A computer system, comprising:
a meta search engine comprising an interface to at least one primary search engine arranged to provide search responses in a search response representation including search result frames; and
a configurator;
wherein the configurator is arranged to:
produce an at least two-dimensional syntax tree of at least a part of the search response representation,
search repetitive equal or similar patterns of syntax elements within the syntax tree, and identify, and thereby localize, the search result frames within the search response representation by an equal or similar appearance of their patterns of syntax elements; and
adapt the interface automatically to a new search response representation of the primary search engine.

20. The computer system of claim 19, wherein the configurator is part of the meta search engine.

21. The computer system of claim 19, wherein the meta search engine and the configurator are locally separated and connected via a network.

22. The computer system of claim 19, wherein the configurator is arranged to automatically extract search results contained within result frames from a search response with a new search response representation.

23. A computer program product including program code for carrying out a method, when executed on a computer system, of automatically configuring an interface to at least one primary search engine for extracting search results including search result frames from a search response from the primary search engine in a search response representation, the computer program comprising:
program code to produce an at least two-dimensional syntax tree of at least a part of the search response representation;
program code to search repetitive equal or similar patterns of syntax elements within the syntax tree, and identify, and thereby localize, the search result frames within the search response representation by an equal or similar appearance of their patterns of syntax elements; and
program code to adapt the interface automatically to the search response representation based on the localized search result frames, at least if it is a new search response representation.

24. The computer program product of claim 23, wherein the program code is stored on a computer-readable data carrier or is in the form of signals transmitted over a computer network.

25. The computer program product of claim 23, wherein one program component for configuring the interface automatically is arranged to recognizes new search response representations and stores these representations, while another program component is arranged to uses the stored representations to process known search response representations.

26. The computer program product of claim 23, wherein the program component that recognizes new search response representations comprises automatically determining the meaning of the parts of the result frame and assigning the corresponding search result information.

* * * * *